United States Patent
Reiser

(10) Patent No.: US 7,807,302 B2
(45) Date of Patent: Oct. 5, 2010

(54) PREVENTING FUEL STARVATION OF A FUEL CELL STACK

(75) Inventor: Carl A. Reiser, Stonington, CT (US)

(73) Assignee: UTC Power Corporation, South Windsor, CT (US)

(*) Notice: Subject to any disclaimer, the term of this patent is extended or adjusted under 35 U.S.C. 154(b) by 1476 days.

(21) Appl. No.: 10/765,737

(22) Filed: Jan. 27, 2004

(65) Prior Publication Data

US 2005/0164050 A1 Jul. 28, 2005

(51) Int. Cl.
*H01M 8/04* (2006.01)
(52) U.S. Cl. .................... 429/400; 429/428
(58) Field of Classification Search ............ 429/13, 429/22
See application file for complete search history.

(56) References Cited

U.S. PATENT DOCUMENTS

| | | | |
|---|---|---|---|
| 3,444,736 A * | 5/1969 | Stedman ............ | 73/861.48 |
| 6,815,101 B2 * | 11/2004 | de Vaal et al. ............ | 429/13 |
| 2002/0001741 A1 * | 1/2002 | Kawasumi et al. ........ | 429/20 |
| 2002/0055023 A1 * | 5/2002 | Rueegge et al. .......... | 429/13 |
| 2004/0126223 A1 * | 7/2004 | Maloney .................. | 415/1 |
| 2004/0137290 A1 * | 7/2004 | Woods et al. ............. | 429/21 |
| 2005/0136296 A1 * | 6/2005 | Skidmore et al. ......... | 429/13 |
| 2005/0161520 A1 * | 7/2005 | Gast ....................... | 237/12 |

* cited by examiner

*Primary Examiner*—Patrick Ryan
*Assistant Examiner*—Karie O'Neill Apicella
(74) *Attorney, Agent, or Firm*—M. P. Williams

(57) ABSTRACT

The direction of flow of purged fuel reactant gas (20) is sensed (38, 39, 44, 53, 54) to ensure it flows outwardly from a fuel cell stack (9) towards the ambient (21). If the purged fuel reactant. gas is not flowing outwardly, a signal (39) causes a controller (26) to open the circuit (35) thereby disconnecting the electrical load (33) from the fuel cell stack.

5 Claims, 3 Drawing Sheets

PREVENTING FUEL STARVATION OF A FUEL CELL STACK

TECHNICAL FIELD

This invention relates to preventing corrosion-causing local reverse currents in fuel cells resulting from inadequate hydrogen flow to the anodes of the fuel cells, by sensing flow direction and interrupting the load if flow is not outward toward ambient.

BACKGROUND ART

It is well known that individual fuel cells, when a fuel cell stack is under a load, that do not receive an adequate, uniform flow of hydrogen will undergo local reverse currents which causes corrosion of the cathode catalyst layer. The corrosion degrades the power output performance of the fuel cell stack.

To assure adequate fuel, and improve the humidity thereof, fuel recycle gas is transferred from the fuel flow field exits to the fuel flow field inlets. This causes build-up of inert (non-fuel) gases in the flow, such as nitrogen passing from air in the cathode, through the porous membrane, to the anode.

Purging of some amount of the fuel flow, to ambient or a burner, is used to reduce the inerts in the recycle gas.

DISCLOSURE OF INVENTION

Objects of the invention include: eliminating corrosion due to fuel starvation in a fuel cell power plant; preventing reverse currents due to fuel starvation in fuel cell power plants; reducing degradation of fuel cell stack performance due to hydrogen starvation; and improved fuel cell stack operation.

This invention is predicated on my discovery that fuel cells in a fuel cell power plant will not undergo local fuel starvation so long as the direction of gas flow in the fuel exhaust system is from the cell stack assembly toward ambient.

According to the present invention, the direction of gas flowing between the fuel reactant gas flow fields of a fuel cell stack assembly and ambient is monitored; a controller disconnects the fuel cell load in the event that flow stops or is reversed.

According to one embodiment of the invention, a very lightly spring loaded flap responds to the minimal flow of gas by assuming a position which can be sensed, such as by a microswitch, to indicate to a controller that flow is in the correct direction; reduction of the flow below the minimal amount permits the spring to move the flap sufficiently that the switch will become opened (assuming a fail-safe configuration) which in turn will cause the controller to disconnect the electrical load of the fuel cell stack.

The present invention is a very simple, low cost and effective way to prevent a prevalent source of fuel cell power plant performance degradation.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
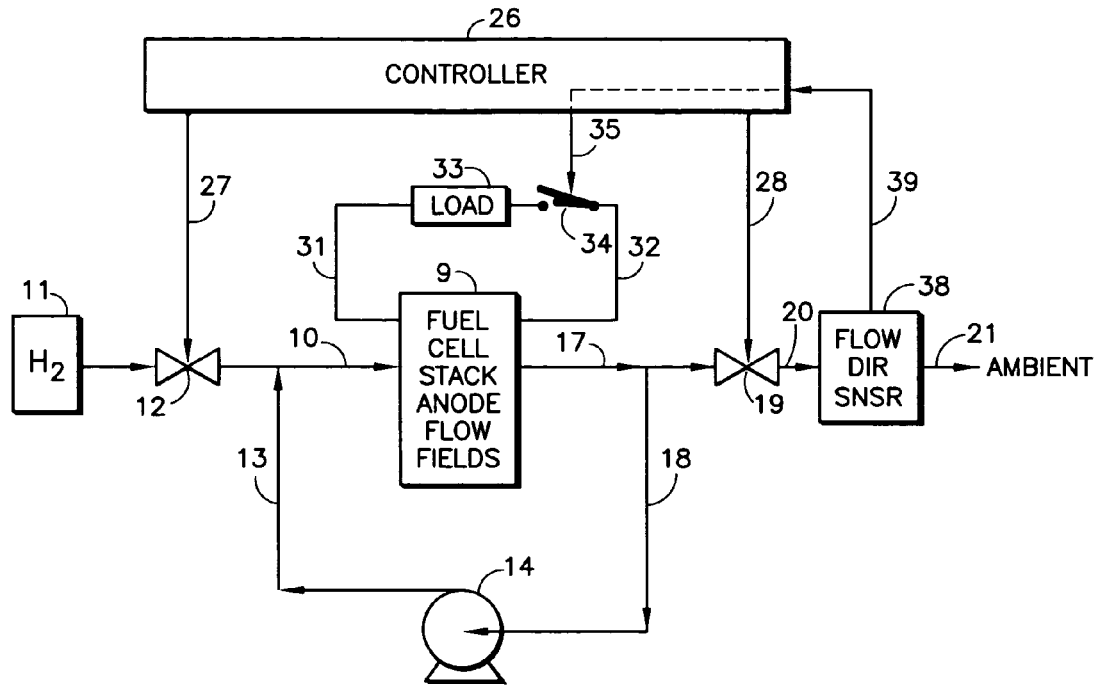
FIG. 1 is a simplified, stylized schematic diagram of a first embodiment of a fuel portion of a fuel cell power plant employing the present invention.

Referring to FIG. 1, the fuel cell stack anode flow fields 9 receive fuel in a conduit 10 which is a combination of fuel from a source 11 that passes through a performance level controlling valve 12, as well as recycled fuel in a duct 13 from a recycle pump 14. The partially depleted fuel exiting the anode flow fields in a duct provides some fuel over a duct 18 to the pump 14, and passes a small portion of the fuel through a valve 19 through a duct 20 to ambient 21. The flow to ambient 21 is to purge the anode flow fields of inerts, such as nitrogen that crosses over from the air in the oxidant flow, through the porous membranes of the fuel cells.

The valves 12, 19 are operated by a controller 26 in response to signals on corresponding lines 27, 28.

The fuel cell stack provides current over power output lines 31, 32 to a load 33, whenever a switch 34 is closed by a signal on a line 35 from the controller 26, all as is known.

In accordance with the invention, the duct 20 is provided with a flow direction sensor 38 which provides a signal on a line 39 indicating when the flow through the duct 20 is outward, that is, toward ambient 21. When the flow is not outward, the signal on the line 39 causes the controller 26 to open the switch 34, thereby removing the load 33 from the fuel cell stack 9.

Figure 2:
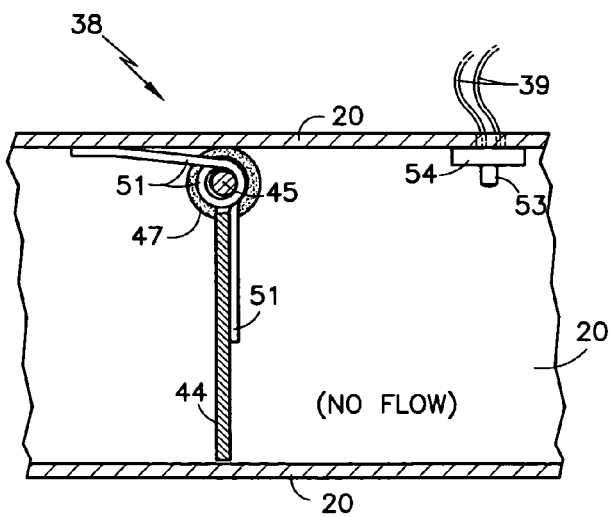
FIG. 2 is a partially sectioned, simplified side elevation view of a flow direction sensor within a duct, according to the present invention, when there is no fuel flowing therethrough.
Figure 3:
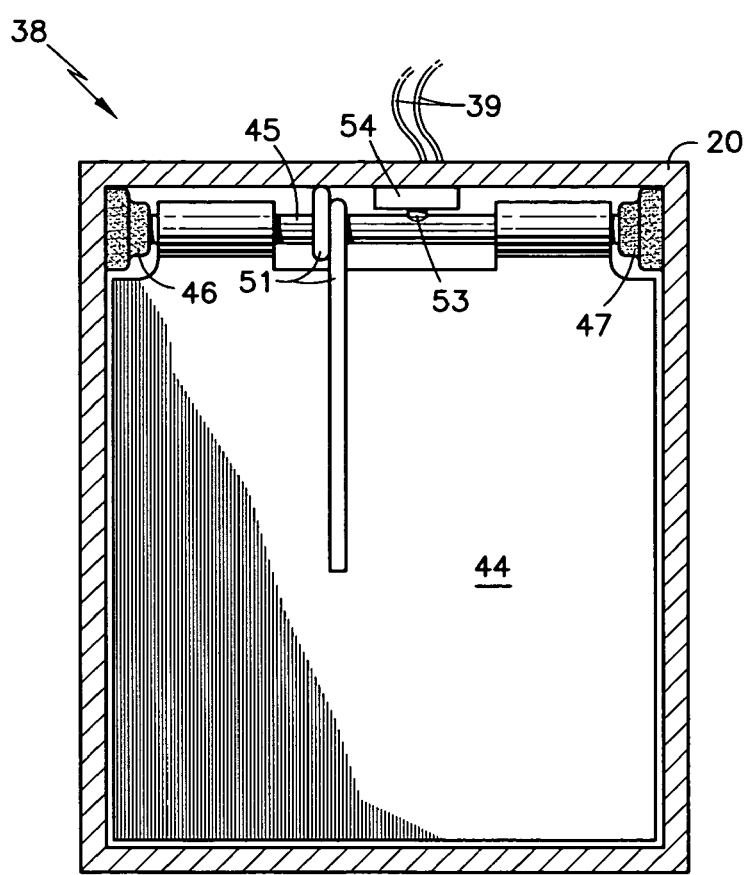
FIG. 3 is a partially sectioned, simplified side elevation view of a flow direction sensor within a duct, according to the present invention, with a minimum flow of fuel therethrough.

Referring to FIGS. 2 and 3, one embodiment of a flow direction sensor 38 is formed within the duct 20 and includes a flap 44 rotatable about an axle 45 which is rotatably disposed in journals 46, 47. A light spring 51 may be wrapped around the axle 45 and be in a relaxed position when the flap 44 is vertical as illustrated in FIG. 2, thereby being responsive to any outward flow which may thereafter commence.

Figure 4:
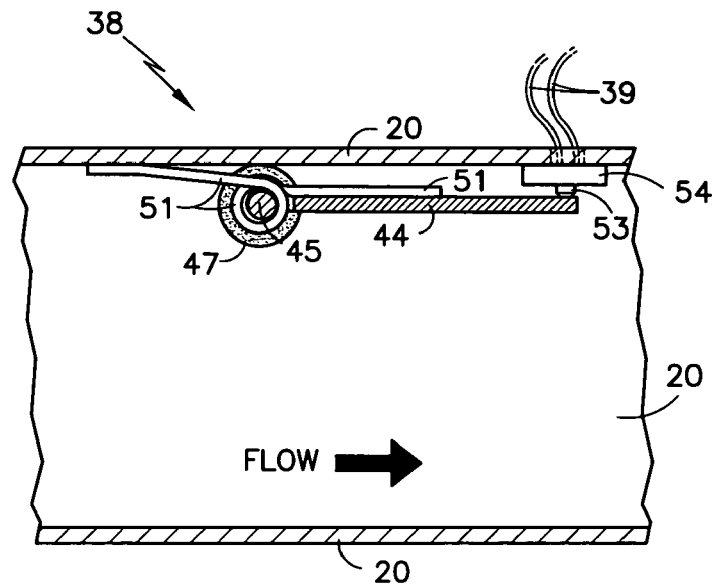
FIG. 4 is a partially sectioned, front elevation view of the apparatus of FIGS. 2 and 3 when there is no flow in the duct.

When there is a flow through the duct 20 equivalent to the minimum flow that an operating fuel cell stack will have, the flow pressure against the flap 44 is sufficient to overcome the spring tension and cause the flap to assume an essentially horizontal position as illustrated in FIG. 4. When in that position, the flap 44 will contact an actuator 53 of a switch 54 thereby providing a signal on the lines 39 to the controller 26 indicating that the flow direction for the purged fuel is outward, toward the ambient 21. In this circumstance, the controller 26 will cause the switch 34 to remain engaged. However, when the flow diminishes even a small amount below the minimum, the flap will close, a little bit or a lot, and even a little bit will cause the switch actuator 53 to be released, opening the switch 54.

If desired, the switch could be open when there is flow and closed when the flow is insufficient. The flap 44 need not essentially close off the duct 20, but instead could be a very light, small vane that would be responsive to flow direction, operating a microswitch in an appropriate fashion.

Figure 5:
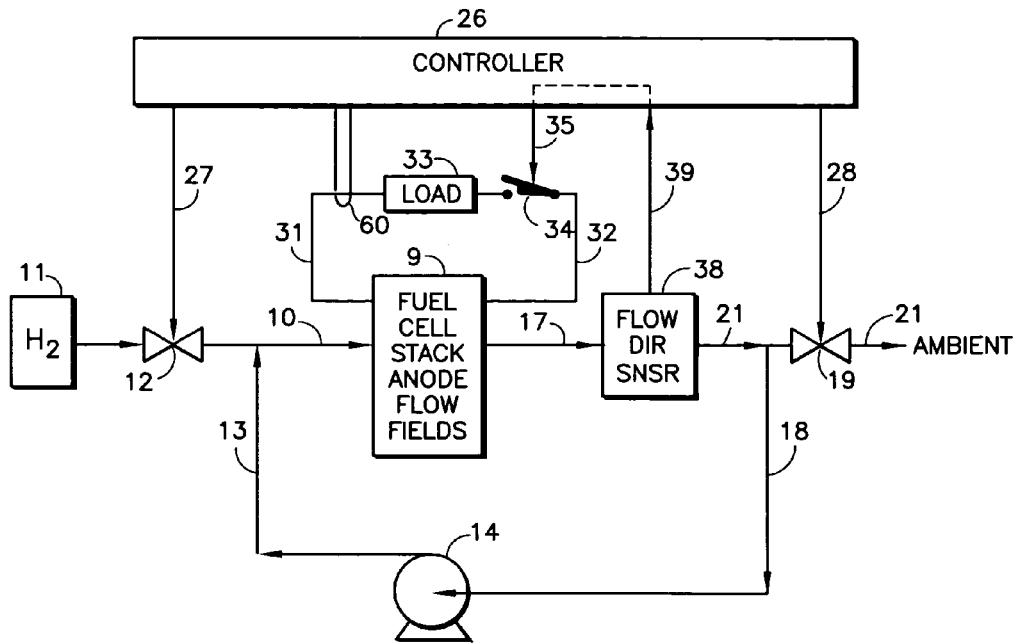
FIG. 5 is a simplified, stylized schematic diagram of a second embodiment of a fuel portion of a fuel cell power plant employing the present invention.

FIG. 5 illustrates that the flow direction sensor may be upstream of the recycle gas conduit 18. This allows intermittent purging of the fuel flow fields through the valve 19, such as with a pulse-width-modulation type of control by the controller in response to load sensed by a current sensor 60.

Figure 6:
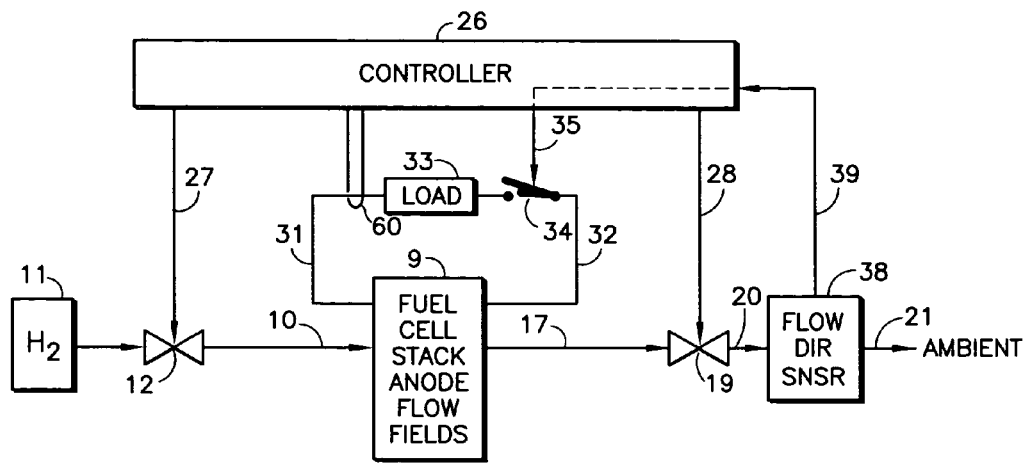
FIG. 6 is a simplified, stylized schematic diagram of a third embodiment of a fuel portion of a fuel cell power plant employing the present invention.

FIG. 6 illustrates that the invention may be used with no recycle loop; the valve 19 may be on either side of the flow direction sensor 38 in this case. The valve 19 should never be closed, positioned in accordance with load (26, 60).

The flow direction sensor 38 need not be that described with respect to FIGS. 2-4. A pair of pressure detectors on opposite sides of a flow impediment may indicate by the relative pressure of the two which way the flow is occurring, the controller then being able to respond to the sense of pressure differential to know which way the flow is, or that there is no flow at all or a tracer gas may be injected at the fuel flow field exit, and the gas downstream of the valve checked for presence thereof.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of reducing performance degradation due to hydrogen starvation of a fuel cell power plant providing electrical power to a load, comprising:
    providing fuel reactant gas to fuel reactant gas flow fields of the fuel cell power plant;
    purging to ambient, at least periodically, at least a small amount of partially depleted fuel reactant gas exiting from said flow fields;
    sensing the direction of flow of gas between said flow fields and ambient; and
    disconnecting the electrical load from the fuel cell stack in the event that there is no flow of gas from said flow fields toward ambient.

2. Apparatus for reducing performance degradation due to hydrogen starvation of a fuel cell power plant providing electrical power to a load, comprising:
    a fuel cell power plant having fuel reactant gas flow fields;
    means for providing fuel reactant gas to said flow fields;
    means for purging at least periodically, at least a small amount of partially depleted fuel reactant gas exiting from said flow fields;
    means for sensing the direction of flow of gas between said flow fields and ambient; and
    means for disconnecting the electrical load from the fuel cell stack in the event that there is no flow of gas from said flow fields toward ambient.

3. Apparatus according to claim 2 wherein said means for sensing the direction of flow comprises a flap disposed within the flow of gas which will operate a switch when the flow of gas is toward ambient.

4. A method of reducing performance degradation due to hydrogen starvation of a fuel cell power plant providing electrical power to a load, comprising:
    providing fuel reactant gas to fuel reactant gas flow fields of the fuel cell power plant;
    purging to ambient, at least periodically, at least a small amount of at least partially depleted fuel reactant gas exiting, from said flow fields;
    sensing the direction of flow of gas from said flow fields; and
    disconnecting the electrical load from the fuel cell stack in response to no flow of gas from said flow fields toward ambient.

5. Apparatus for reducing performance degradation due to hydrogen starvation of a fuel cell power plant providing electrical power to a load, comprising:
    a fuel cell power plant having fuel reactant gas flow fields;
    means for providing fuel reactant gas to said flow fields;
    means for purging at least periodically, at least a small amount of fuel reactant gas exiting from said flow fields;
    means for sensing the direction of flow of gas from said flow fields; and
    means for disconnecting the electrical load from the fuel cell stack in response to no flow of gas from said flow fields toward ambient.

* * * * *